(12) United States Patent
Kozawa et al.

(10) Patent No.: US 10,246,127 B2
(45) Date of Patent: Apr. 2, 2019

(54) ROTATIONAL ANGLE DETECTING DEVICE AND ELECTRIC POWER STEERING DEVICE USING THE SAME

(71) Applicant: DENSO CORPORATION, Kariya, Aichi-pref. (JP)

(72) Inventors: Takaharu Kozawa, Konan (JP); Toshihiro Fujita, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 420 days.

(21) Appl. No.: 14/631,260

(22) Filed: Feb. 25, 2015

(65) Prior Publication Data

US 2015/0239496 A1 Aug. 27, 2015

(30) Foreign Application Priority Data

Feb. 27, 2014 (JP) .................................. 2014-36936

(51) Int. Cl.
*G01B 7/30* (2006.01)
*B62D 15/02* (2006.01)
*B62D 5/04* (2006.01)

(52) U.S. Cl.
CPC ........... *B62D 5/0484* (2013.01); *B62D 5/046* (2013.01); *B62D 5/0463* (2013.01);
(Continued)

(58) Field of Classification Search
CPC .. B62D 5/0484; B62D 5/0486; B62D 5/0463; B62D 5/0481; B62D 6/00; B62D 15/021; B62D 15/0235; G01B 7/30
(Continued)

(56) References Cited

U.S. PATENT DOCUMENTS 4,771,846 A * 9/1988 Venable ................. B62D 5/005
180/422
2003/0163245 A1* 8/2003 Aue ........................ B60T 8/885
701/113
(Continued)

FOREIGN PATENT DOCUMENTS

JP 2008-170162 7/2008
JP 2010-014651 1/2010
(Continued)

OTHER PUBLICATIONS

Fujita et al. U.S. Appl. No. 14/631,334, filed Feb. 25, 2015.
(Continued)

*Primary Examiner* — Whitney Moore
*Assistant Examiner* — Herve-Louis Y Assouman
(74) *Attorney, Agent, or Firm* — Nixon & Vanderhye P.C.

(57) ABSTRACT

A rotational angle detecting device has a detecting element that detects a rotating magnetic field of a magnet that is variable according to a rotation of a motor. A rotational angle calculator calculates a rotational angle and a rotation number. A power supply failure determining circuit has a volatile memory that stores power supply failure information indicating that power supply failure occurs in which electric power is not supplied to the rotational angle detecting device from a battery. A communication portion outputs the rotational information and output information corresponding to the power supply failure information to the controller. The communication portion receives a notifying signal after the controller receives the output information indicating that the power supply failure occurs. The volatile memory stores the power supply failure information indicating that the power supply failure occurs after the power supply failure occurs until the communication portion receives the notifying signal.

16 Claims, 4 Drawing Sheets

(52) U.S. Cl.
CPC ......... *B62D 5/0481* (2013.01); *B62D 15/021* (2013.01); *B62D 15/0235* (2013.01); *G01B 7/30* (2013.01)

(58) Field of Classification Search
USPC .......................................................... 702/151
See application file for complete search history.

(56) References Cited

U.S. PATENT DOCUMENTS

| | | | | |
|---|---|---|---|---|
| 2006/0190747 | A1* | 8/2006 | Fukumori | G11B 19/04 713/300 |
| 2006/0293818 | A1* | 12/2006 | Lu | B62D 15/0235 701/41 |
| 2007/0235247 | A1* | 10/2007 | Hirakawa | B62D 5/0406 180/444 |
| 2007/0271441 | A1* | 11/2007 | Shaw | G06F 9/3005 712/41 |
| 2009/0319125 | A1* | 12/2009 | Lavoie | B62D 15/021 701/41 |
| 2012/0041658 | A1* | 2/2012 | Turner | B62D 15/0215 701/68 |
| 2014/0019009 | A1 | 1/2014 | Kogiso | |
| 2017/0291640 | A1 | 10/2017 | Fujita et al. | |

FOREIGN PATENT DOCUMENTS

| | | |
|---|---|---|
| JP | 2012-046047 | 3/2012 |
| JP | 5339095 | 11/2013 |

OTHER PUBLICATIONS

Office Action (2 pages) dated Feb. 23, 2016, issued in corresponding Japanese Application No. 2014-036936 and English translation (3 pages).

* cited by examiner

ROTATIONAL ANGLE DETECTING DEVICE AND ELECTRIC POWER STEERING DEVICE USING THE SAME

CROSS REFERENCE TO RELATED APPLICATION

This application is based on and incorporates herein by reference Japanese Patent Application No. 2014-36936 filed on Feb. 27, 2014.

TECHNICAL FIELD

The present disclosure relates to a rotational angle detecting device and an electric power steering device using the same.

BACKGROUND

Conventionally, a rotational angle detecting device that detects a rotational angel of a rotating shaft of a motor has been known. For example, a rotational angle detecting device disclosed in a Patent Literature (JP 5339095 B), which is used for an electric power steering device, is powered by electric power from a battery. A controlling unit is disposed in the electric power steering device and calculates a rotational angle of a steering shaft based on a rotational angle of an electric power motor.

SUMMARY

According to the study by inventors of the present disclosure, a reduction in a voltage applied to a rotational angle detecting device occurs due to abnormality in a harness or a power supply circuit, a voltage drop of a battery, or battery replacement. When such a voltage reduction occurs, rotational information, such as the rotational angle of the steering shaft, may be cancelled (reset). In the Patent Literature, since the controlling unit is unable to determine whether the rotational information is reset due to the voltage reduction, the controlling unit may execute power steering control using the rotational information after being reset.

It is an objective of the present disclosure to provide a rotational angle detecting device that detects that power supply failure occurs, and an electric power supply device using the same.

In an aspect of the present disclosure, a rotational angle detecting device is connected to a battery. The rotational angle detecting device outputs rotational information of a detection object to a controller connected to the battery through an ignition switch. The ignition switch switches power supply to the controller from the battery. The rotational angle detecting device includes a sensor, a calculator, a memory and a communication portion.

The sensor detects a detection value that is variable according to a rotation of the detection object. The calculator calculates the rotational information based on the detection value detected by the sensor.

The memory stores power supply failure information whether power supply failure occurs in which electric power is not supplied to the rotational angle detecting device from the battery.

The communication portion outputs the rotational information and output information corresponding to the power supply failure information stored in the memory to the controller. The communication portion receives a notifying signal from the controller that outputs the notifying signal after receiving the output information indicating that the power supply failure occurs.

The memory stores the power supply failure information indicating that the power supply failure occurs, during a period after the power supply failure occurs until the communication portion receives the notifying signal from the controller.

The rotational angle detecting device can maintain at least a portion of operation by electric power from the battery while the ignition switch is turned off. Specifically, the rotational angle detecting device detects and calculates rotational information of a detection object, such as a rotational angle or a number of rotations, while the ignition switch is turned off. Thus, the rotational information during the turn-off of the ignition switch can be used for a variety of calculations.

The memory stores (retains) the power supply failure information indicating that the power supply failure occurs, during a period after the power supply failure occurs until the communication portion receives the notifying signal from the controller. Therefore, the controller can be informed of occurrence of the power supply failure. As a result, the controller can recognize the power supply failure and properly execute a fail-safe process.

Further, the rotational angle detecting device can detect the power supply failure by itself. Therefore, electric consumption during the turn-off of the ignition switch can be suppressed compared to a case in which the controller detects and determines the power supply failure.

The rotational angle detecting device is preferably applied to an electric power steering device. The electric power steering device includes a motor that outputs an assistance torque to assist steering of a steering member by a driver, the rotational angle detecting device and an electric control unit. The electric control unit includes the controller controlling the motor. The controller calculates a rotational angle of a steering shaft connected to the steering member based on the rotational information.

The rotational angle detecting device can detect the power supply failure, and the output information corresponding to the power supply failure information stored in the memory is output to the controller. Therefore, the controller can recognize whether the power supply failure occurs. Then, if the controller receives the output information indicating that the power supply failure occurs, the controller can properly execute a fail-safe process.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
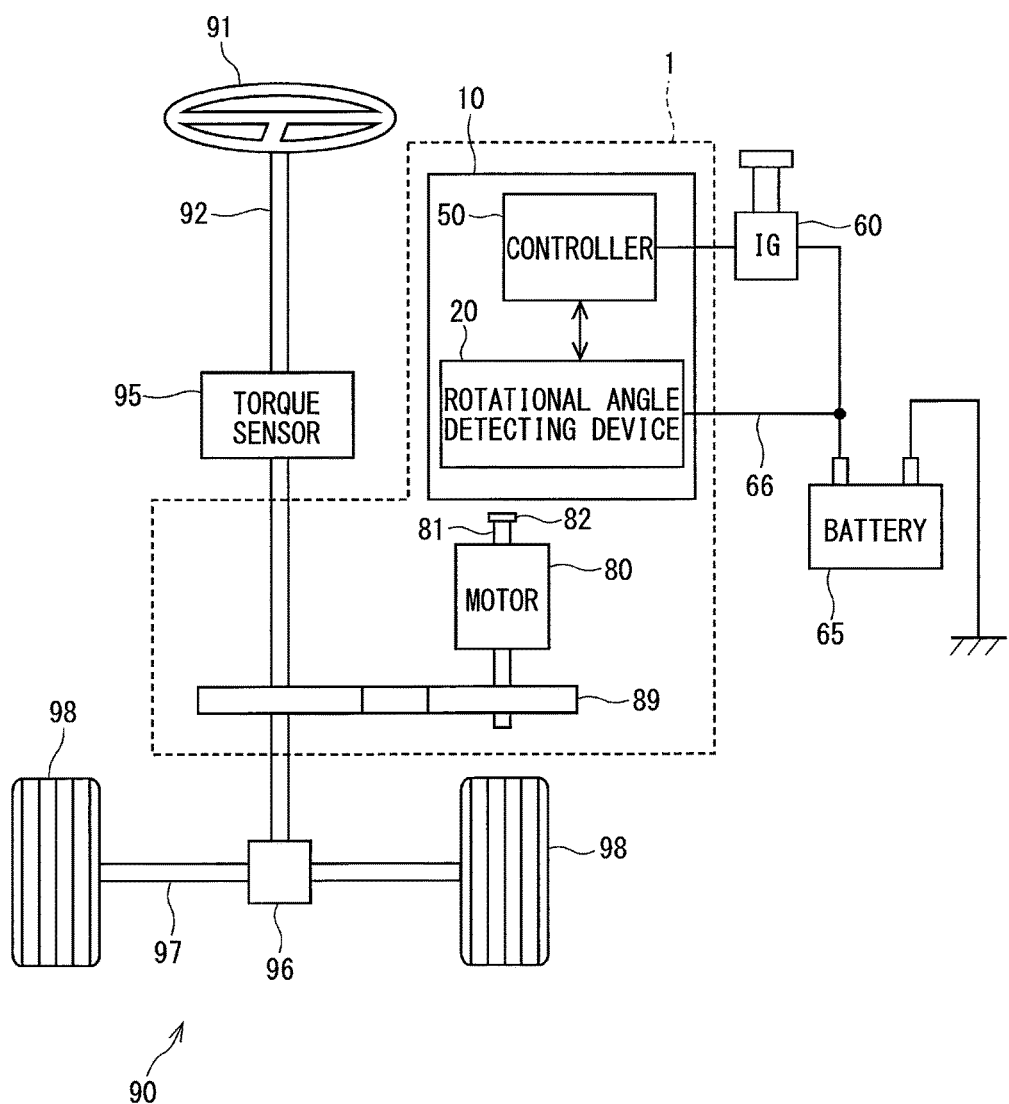
FIG. 1 is a schematic view of an entire configuration of an electric power steering device.

A plurality of embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

As shown in FIG. 1, a rotational angle detecting device 20 and a motor 80 are applied to an electric power steering device 1 that supports steering by a driver.

FIG. 1 shows an entire configuration of a steering system 90 including the electric power steering device 1. The steering system 90 includes a steering wheel 91 as a steering member, a steering shaft 92, a pinion gear 96, a rack shaft 97, wheels 98 and the electric power steering device 1.

The steering wheel 91 is mechanically connected to the steering shaft 92. A torque sensor 95 is attached to the steering shaft 92 to detect a steering torque applied to the steering wheel 91 by a driver. The pinion gear 96 is disposed at an end of the steering shaft 92, and engages the rack shaft 97. The two wheels 98 are connected to both ends of the rack shaft 97 through, for example, tie rods.

When a driver manipulates the steering wheel 91, the steering shaft 92 connected to the steering wheel 91 rotates. A rotational motion of the steering shaft 92 is converted into a linear motion of the rack shaft 97 through the pinion gear 96, and the wheels 98 are steered (i.e., rotate) by a steering angle according to a displacement of the rack shaft 97.

The electric power steering device 1 includes the motor 80, a reduction gear 89 and an electric control unit (ECU) 10. The motor 80 outputs an assistance torque to assist steering of the steering wheel 91 by a driver. The reduction gear 89 decelerates the rotation of the motor 80 and transmits the decelerated rotation of the motor 80 to the steering shaft 92 or the rack shaft 97. The ECU 10 controls the motor 80.

The motor 80 is operated by electric power supplied from the battery 65 and rotates the reduction gear 89 in a forward or backward direction.

The motor 80 is a three-phase brushless motor and includes a shaft 81, a rotor (not shown), stator (not shown), or the like. The rotor is a cylindrical member and rotates together with the shaft 81. A permanent magnet is disposed on a surface of the rotor, and thus the rotor has magnetic poles. The stator rotatably houses the rotor therein relative to the stator. The stator has protrusions, which inwardly protrude in a radial direction of the stator, and the protrusions are arranged with intervals in a circumferential direction of the stator. A winding wire is wound around each protrusion. The rotor and the shaft 81 rotate by switching energization to the winding wires. One end of the shaft 81 protrudes from a motor case toward the ECU 10, and a magnet 82 is disposed on the one end of the shaft 81.

The ECU 10 includes the rotational angle detecting device 20, the controller 50, or the like.

The rotational angle detecting device 20 detects a rotational angle θm of the motor 80. In the present embodiment, the motor 80 may provide "detection object". The rotational angle detecting device 20 detects a change of a magnetic field by rotation of the magnet 82 that integrally rotates with the rotor and the shaft 81. It should be noted that, in FIG. 1 illustrating a schematic view of the steering system 90, the rotational angle detecting device 20 is positioned separately from the magnet 82. However, the rotational angle detecting device 20 (especially, a detecting element 21 as described below) is positioned so close to the magnet 82 as to detect a rotating magnetic field of the magnet 82.

The rotational angle detecting device 20 is directly connected the battery 65 through a harness 66 without through an ignition switch (hereinafter referred to as "IG switch") 60, and electric power from the battery 65 is directly supplied to the rotational angle detecting device 20. Hence, electric supply to the rotational angle detecting device 20 from the battery 65 is maintained while the IG switch 60 is turned off. Accordingly, the rotational angle detecting device 20 can perform at least a portion of operation during the turn-off of the IG switch 60, as described below.

When abnormality in the harness 66 or a power supply circuit, or a voltage drop of the battery 65 (i.e., "battery exhaustion") occurs, or when the battery 65 is detached from a vehicle for battery replacement, voltage applied to the rotational angle detecting device 20 is stopped (or significantly reduced). It should be noted that a state in which voltage applied to the rotational angle detecting device 20 from the battery 65 has a value less than a specified value may be described as "the sensor power supply is turned off" or "sensor power supply failure (or, merely, power supply failure)". Whereas, a state in which voltage applied to the rotational angle detecting device 20 has a value equal to or greater than the specified value may be described as "the sensor power supply is turned on". In other words, the power supply failure may include a state in which electric power supply to the rotational angle detecting device 20 from the battery 65 is zero or significantly low.

Figure 2:
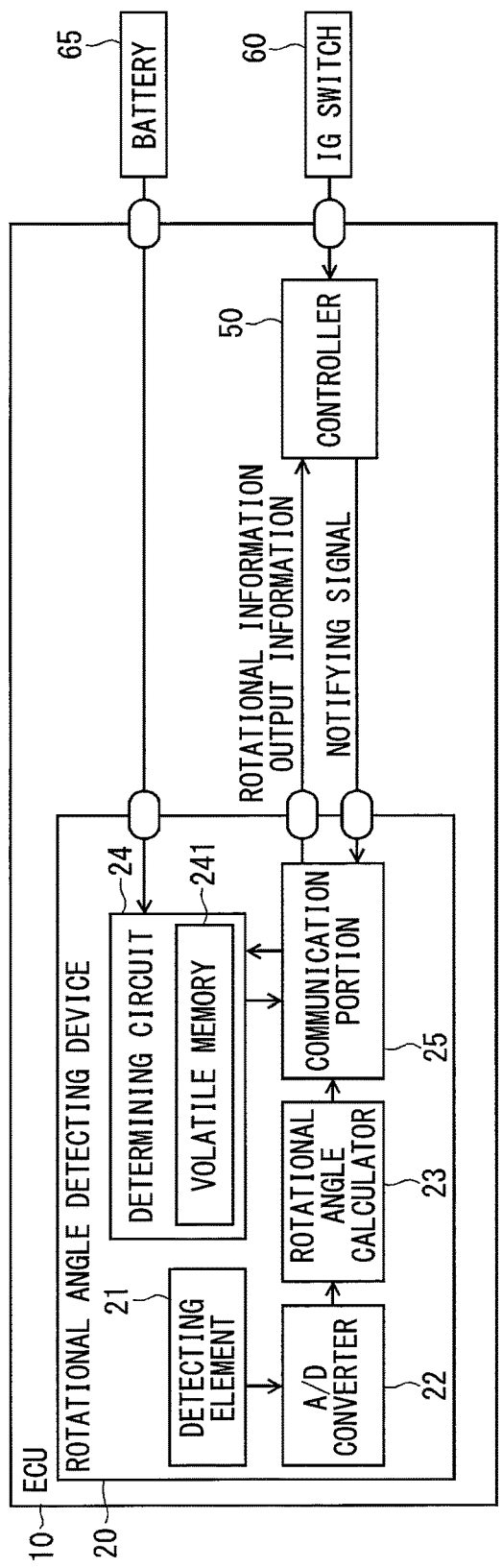
FIG. 2 is a block diagram of an electric control unit of the electric power steering device.

As shown in FIG. 2, the rotational angle detecting device 20 includes the detecting element 21 as a sensor, an A/D converter (Analog-to-Digital converter) 22, a rotational angle calculator 23 as a calculator, a power supply failure determining circuit 24 and a communication portion 25.

The detecting element 21 is, for example, a hall effect sensor (a hall element) or an MR (magnetoresistive) sensor (an MR element), and detects a rotating magnetic field according to a rotation of the magnet 82. In the present embodiment, "the rotating magnetic field according to a rotation of the magnet 82" may correspond to "detection value that is variable according to a rotation of the detection object".

The A/D converter 22 converts a detection value output from the detecting element 21 in analog form into digital form. The A/D converter 22 outputs the detection value in digital form to the rotational angle calculator 23.

The rotational angle calculator 23 calculates the rotational angle θm of the motor 80 based on the detection value that is detected by the detecting element 21 and converted by the A/D converter 22. The rotational angle θm of the present embodiment is a mechanical angle (mechanical radian). The rotational angle calculator 23 also calculates the number of rotations of the motor 80 (rotation number N) based on the rotational angle θm. In the present embodiment, the rotational angle θm and the rotation number N may be included in "rotational information".

The power supply failure determining circuit 24 includes a volatile memory 241 as a memory. The volatile memory 241 serves as a power supply failure flag. The volatile memory 241 has an initial value "0" that represents the power supply failure flag is set. Whereas, the volatile memory 241 stores a normal value "1" that represents the power supply failure is not set. In the present embodiment, the initial value "0" and the normal value "1" of the volatile memory 241 may correspond to "power supply failure information".

When the sensor power supply is turned off, the volatile memory 241 returns stored data (i.e., the power supply failure information) to the initial value "0". Further, even after the sensor power supply is turned on, i.e., after electric power is supplied to the rotational angle detecting device 20 from the battery 65, the volatile memory 241 keeps storing (holds) the initial value "0". In the present embodiment, the volatile memory 241 keeps storing (holds) the initial value "0" until the rotational angle detecting device 20 receives a notifying signal (as described below) from the controller 50. When the rotational angle detecting device 20 receives the notifying signal from the controller 50, the volatile memory 241 stores (changes) the normal value "1" as the power supply failure information In the present embodiment, a state in which the volatile memory 241 stores the initial value "0" may correspond to "the power supply failure information indicating that the power supply failure occurs".

The communication portion 25 is a serial interface and outputs the rotational information of the rotational angle θm and the rotation number N, which are calculated by the rotational angle calculator 23, to the controller 50. Also, the communication portion 25 outputs output information corresponding to the stored date (i.e., the initial value "0" or the normal value "1") to the controller 50. Specifically, when the volatile memory 241 stores the initial value "0", the communication portion 25 outputs bit information of "0" as the output information to the controller 50. Whereas, when the volatile memory 241 stores the normal value "1", the communication portion 25 outputs bit information of "1" as the output information to the controller 50. In the present embodiment, as a counter measure for a bit error, the output information is represented using two bits to avoid erroneous determination of the power supply failure. The controller 50 determines that the power supply failure flag is not set when at least one bit of two bits represents "1" in the output information (i.e., "01", "10", or "11"). Whereas, the controller 50 determines that the power supply failure flag is set when both two bits represent "0" in the output information (i.e., "00").

The communication portion 25 receives the notifying signal that is output from the controller 50 after the controller 50 receives the output information indicating that the power supply failure occurs. As described below, the controller 50 outputs the notifying signal immediately after executing a fail-safe process. The notifying signal is a signal instructing that the volatile memory 241 rewrites the stored date to the normal value "1" from the initial value "0". In other words, the notifying signal may be a signal instructing the volatile memory 241 to set the power supply failure flag.

As shown in FIG. 1, the controller 50 controls the motor 80 and includes a microcomputer that executes a variety of calculations. The controller 50 is electrically connected to the battery 65 through the IG switch 60 and a regulator (not shown), and electric power is supplied to the controller 50 from the battery 65. When the IG switch 60 is turned off, electric power is not supplied to the controller 50.

The controller 50 obtains the rotational angle θm of the motor 80 and the rotation number N from the communication portion 25. The controller 50 controls the motor 80 based on the rotational angle θm, a steering angle θst that is a rotational angle of the steering shaft 92, a steering torque detected by the torque sensor 95, or the like.

The controller 50 calculates the steering angle θst based on the rotational angle θm, the rotation number N, and a gear ratio of the reduction gear 89. With the configuration, a steering sensor that detects the steering angle θst can be eliminated.

The controller 50 learns a neutral position of the steering wheel 91 based on the steering angle θst. The controller 50 learns the neutral position based on, for example, the steering angle θst calculated while a vehicle in straight travel at a constant speed for a specified time. The controller 50 stores the neutral position calculated. In other words, the controller 50 learns an absolute angle of the steering wheel 91.

If the steering wheel 91 is manipulated by a driver during turn-off of the IG switch 60, the steering angle θst is changed. Along with the change of the steering angle θst, the rotational angle θm and the rotation number N may be also changed.

However, if the rotation number N during the turn-off of the IG switch 60 and the rotational angle θm at the time of turning on the IG switch 60 (i.e., a motor position) are available when the IG switch 60 is turned on again, the steering angle θst can be calculated using the neutral position of the steering wheel 91 stored in the controller 50 along with the rotational information. Therefore, in the present embodiment, the rotational angle detecting device 20 continues calculating the rotational angle θm and the rotation number N even during the turn-off of the IG switch 60. Then, when the ignition switch 60 is turned on again and the controller 50 receives the output information indicating that the power supply failure does not occur (i.e., "1"), the controller 50 calculates the steering angle θst of the steering shaft 92 using the neutral position of the steering wheel 91 stored and the rotational information (i.e., the rotational angle θm and the rotation number N). Therefore, when the IG switch 60 is turned on without the occurrence of the power supply failure, the controller 50 need not relearn the neutral position of the steering wheel 91. However, it should be noted that, when the rotation number N during the turn-off of the IG switch 60 is not calculated due to the power supply failure, the neutral position of the steering wheel 91 needs to be relearned to obtain the steering angle θst, as described below.

When the power supply failure occurs, the rotational angle detecting device 20 (the rotational angle calculator 23) cannot calculate the rotation number N during the power supply failure. Therefore, if the steering angle θst would be calculated using the neutral position stored in the controller 50 when the IG switch 60 is turned on next time, the steering angle θst calculated may be different from the actual steering angle θst. Accordingly, the controller 50 needs to relearn the neutral position of the steering wheel 91 to calculate the steering angle θst when the IG switch 60 is turned on again after the power supply failure occurs. That is, the controller 50 relearns the neutral position of the steering wheel 91 as the safe-failure process when the IG switch 60 is turns on and the controller 50 receives the output information indicating that the power supply failure occurs. Hence, the controller 50 can calculate the steering angle θst using the neutral position relearned. The controller 50 outputs the notifying signal to the communication portion 25 immediately after completing relearning the neutral position of the steering wheel 91.

Further, to suppress electric consumption at the controller 50, electric power is not supplied to the controller 50 during the turn-off of the IG switch 60. Then, in the present embodiment, the rotational angle detecting device 20, to which electric power is supplied from the battery 65 even during the turn-off of the IG switch 60, detects whether the power supply failure occurs.

Next, a power supply failure determination process executed by the rotational angle detecting device 20 will be described with reference to a flowchart illustrated in FIG. 3. The process is repeatedly executed at given intervals regardless of the turn-on/off of the IG switch 60. It should be noted that the process in FIG. 3 may be executed by software or hardware. Further, in FIG. 3, a state in which the power supply failure flag is set is expressed as "power supply failure flag ON", and a state in which the power supply failure flag is not set is expressed as "power supply failure flag OFF", which also applies to FIG. 4.

In Step 101, sensor power supply voltage is applied to the rotational angle detecting device 20 from the battery 65.

As Step 102, it is determined whether the sensor power supply is turned off from a turn-on state. When the sensor power supply is turned off from the turn-on state (S102: YES), the process proceeds to Step 104. When the sensor supply is not turned off from the turn-on state (S102: NO), the process proceeds to S103.

At Step 103, it is determined whether the sensor power supply is turned off, i.e., the sensor power supply failure occurs. When the sensor power supply is not turned off (S103: NO), i.e., the turn-on state of the sensor power supply is maintained, the process proceeds to S108. When the sensor power supply is turns off (S103: YES), the process proceeds to Step 110.

At Step 104, to which the process proceeds when the sensor power supply is turned on from a turn-off state (S102: YES), the volatile memory 241 stores the initial value "0", i.e., the volatile memory 241 maintains a state in which the power supply failure flag is set.

At Step 105, since the volatile memory 241 stores the initial value "0", the communication portion 25 outputs the bit information of "0" as the output information to the controller 50.

As with Step 103, at Step 106, it is determined whether the sensor power supply is turned off. When the sensor power supply is turned off (S106: YES), the process proceeds to Step 110. In other words, when the sensor power supply is turned off again in the state in which the power supply failure flag is set after the sensor power supply had been turned on, the process proceeds to Step 110. When the sensor power supply is not turned off (S106: NO), the process proceeds to S107.

At Step 107, it is determined whether the communication portion 25 receives the notifying signal from the controller 50. In the present embodiment, when the controller 50 completes learning the neutral position of the steering wheel 91, the controller 50 outputs the notifying signal to the rotational angle detecting device 20 (the communication portion 25). When the communication portion 25 does not receive the notifying signal from the controller 50 (S107: NO), the process returns to Step 104. When the communication portion 25 receives the notifying signal from the controller 50 (S107: YES), the process proceeds to Step 108.

At Step 108, to which the process proceeds when the sensor power supply is turned on (S103: NO) or the communication portion 25 receives the notifying signal (S107: YES), the volatile memory stores the normal value "1", whereby the power supply failure flag is reset.

As Step 109, since the volatile memory 241 stores the normal value "1", the communication portion 25 outputs the bit information of "1" as the output information to the controller 50.

As Step 110, to which the process proceeds when the sensor power supply is turned off (S103: YES, or S106: YES), the volatile memory 241 stores the initial value "0" and the power supply failure flag is set.

Figure 4:
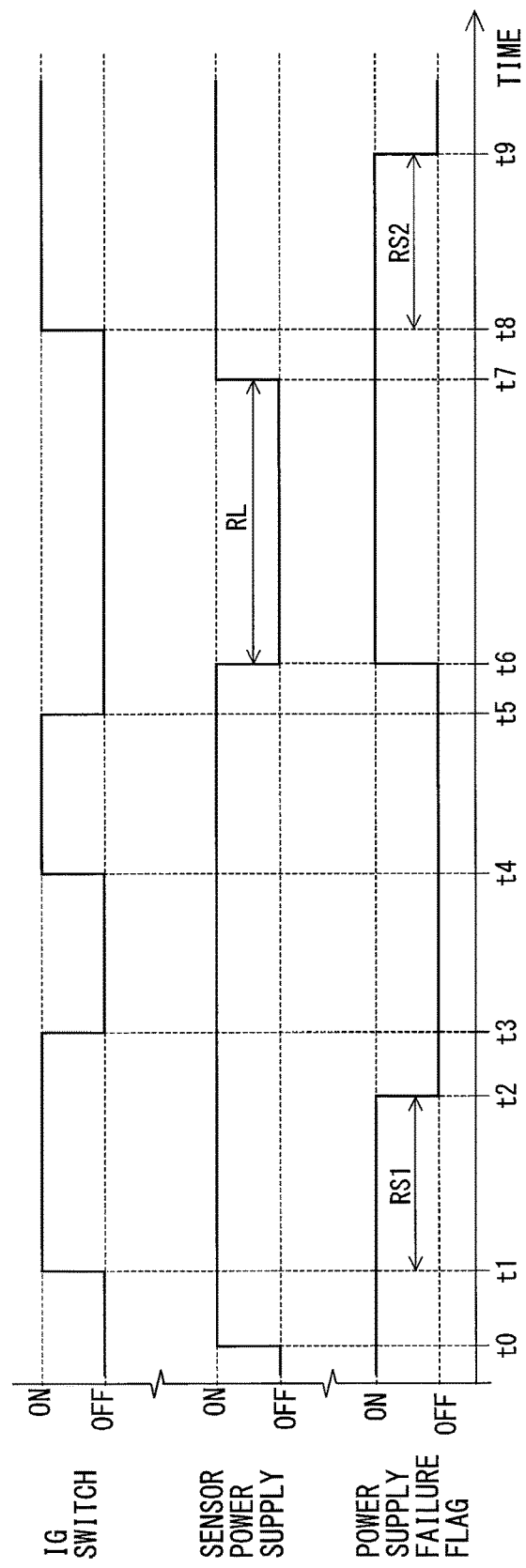
FIG. 4 is a timing diagram of the power supply failure determination process.

Next, the power supply failure determination process will be described with reference to the flowchart shown in FIG. 4.

Figure 3:
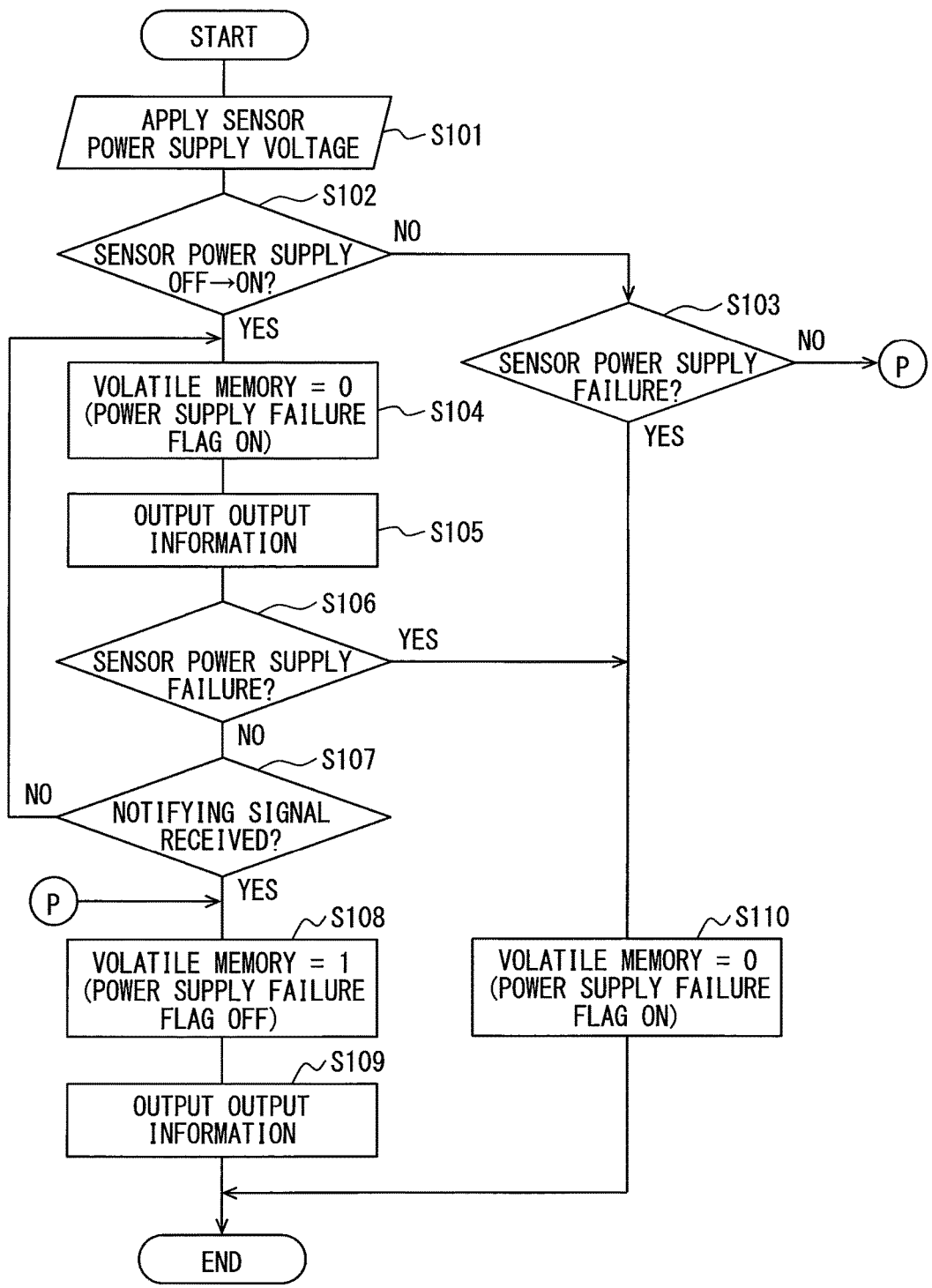
FIG. 3 is a flowchart of a power supply failure determination process.

At timing t0, the rotational angle detecting device 20 is electrically connected to the battery 65 (S102 in FIG. 3: YES). In this time, since the IG switch 60 is not turned on and the communication portion 25 does not receive the notifying signal from the controller 50 (S107: NO), a state in which the power supply failure flag is set, in other words, a state in which the volatile memory 241 stores the initial value "0", is maintained. When the IG switch 60 is turned on at timing t1, operation of the controller 50 is started. When the controller 50 completes learning the neutral position of the steering wheel 91 and the rotational angle detecting device 20 receives the notifying signal at timing t2 (S107: YES), the volatile memory 241 stores the normal value "1" (S108), and the power supply failure flag is reset (S108). Further, the communication portion 25 outputs the bit information of "1" as the communication portion, which indicates that the power supply failure flag is reset, to the controller 50 (S109).

Since power supply from the battery 65 to the rotational angle detecting device 20 is maintained during period after the IG switch 60 is turned off at timing t3 until the IG switch 60 is turned on at timing t4 (S103: NO), the volatile memory 241 keeps storing the normal value "1", and thus the state in which the power supply failure flag is reset is maintained (S108).

Whereas, when the IG switch 60 is turned off at timing t5 and the power supply from the battery 65 to the rotational angle detecting device 20 is stopped at timing t6 (S102: YES), the volatile memory 241 returns the stored data to the initial value "0" and the electric power supply flag is set (S110). The rotational angle detecting device 20 cannot detect the rotational angle θm and the rotation number N during a period RL after the power supply to the rotational angle detecting device 20 is stopped at the timing t6 until the power supply is resumed. Therefore, if the steering wheel 91 is manipulated by a driver and the rotor rotates at least one rotation, and thereafter the IG switch 60 is turned on again, the steering angle θm calculated based on the neutral position of the steering wheel 91, that is stored in the controller 50, would be different from the actual angle of the steering shaft 92.

In view of the above, the volatile memory 241 keeps storing the initial value "0" until timing t9 when the rotational angle detecting device 20 receives the notifying signal from the controller 50 (S107: NO). As such, the state in which the power supply failure flag is set is maintained (S104), and the communication portion 25 outputs the bit information of "0" to the controller 50 as the output information indicating that the power supply failure flag is set (S105).

Accordingly, the controller 50 can be informed of the occurrence of the power supply failure during the turn-off of the IG switch 60.

When the IG switch 60 is turned on at timing t8, the controller 50 is informed of the power supply failure and relearns the neutral position of the steering wheel 91. It should be noted that the controller 50 operates without the neutral position of the steering wheel 91 until the controller 50 completes relearning the neutral position of the steering wheel 91.

When the rotational angle detecting device 20 (the communication portion 25) receives the notifying signal from the controller 50 at the timing t9 at which the controller 50 completes relearning the neutral position of the steering wheel 91 (S107: YES), the volatile memory 241 stores the normal value "1" and the power supply failure flag is reset (S108).

It should be noted that a required time to learn the neutral position of the steering wheel 91 may change according to traveling conditions. Thus, a learning time RS1 may not always coincide with a learning time RS2, as shown in FIG. 4. Further, since FIG. 4 schematically illustrates the timing chart of the power supply failure determination process, intervals between the respective timings t1 to t9 in FIG. 4 may not coincide with the actual intervals.

As described above, the rotational angle detecting device 20 is configured to perform at least a portion of operation by electric power from the battery 65 during the turn-off of the IG switch 60. The rotational angle detecting device 20 includes the detecting element 21, the rotational angle calculator 23, the power supply failure determining circuit 24 (the volatile memory 241), and the communication portion 25.

The detecting element 21 detects the rotating magnetic field of the magnet 82 that changes according to a rotation of the motor 80.

The rotational angle calculator 23 calculates the rotational angle θm and the rotation number N based on the detection value detected by the detecting element 21.

The power supply failure determining circuit 24 includes the volatile memory 241 that stores the power supply failure information that indicates whether the power supply failure occurs in which electric power is not supplied to the rotational angle detecting device 20.

The communication portion 25 outputs the rotational angle θm and the rotation number N, as the rotational information, and the output information corresponding to the power supply failure information stored in the volatile memory 241, to the controller 50. The communication portion 25 receives the notifying signal, which indicates that the controller 50 receives the output information, from the controller 50.

When the power supply failure occurs, the volatile memory 241 keeps storing the power supply failure information indicating that the power supply failure occurs, until the communication portion 25 receives the notifying signal. Specifically, the volatile memory 241 keeps storing the initial value "0" until the rotational angle detecting device 20 receives the notifying signal after the power supply failure occurs. In this case, the power supply failure flag is considered to be set.

The rotational angle detecting device 20 can perform a portion of operation by electric power from the battery 65 during the turn-off of the IG switch 60. More specifically, the rotational angle detecting device 20 detects and calculates the rotational angle θm of the motor 80 and the rotation number N during the turn-off of the IG switch 60. Hence, the rotational angle θm and the rotation number N, which are calculated during the turn-off of the IG switch 60, can be used for a variety of kinds of calculations.

The volatile memory 241 keeps storing the initial value "0" as the power supply failure information until the rotational angle detecting device 20 receives the notifying signal from the controller 50 after the power supply failure occurs. Therefore, the power supply failure can be recognized from the stored data of the volatile memory 241, in other words, the controller 50 can be informed of the power supply failure. As such, the controller 50 can recognize the power supply failure upon turning on the IG switch 60 and thus a fail-safe process can be properly executed by the controller 50.

Further, the rotational angle detecting device 20 can detect the power supply failure by itself. Accordingly, electric consumption during the turn-off of the IG switch 60 can be suppressed compare to a case in which, for example, the controller 50 detects the power supply failure.

The volatile memory 241 returns the stored data to the initial value "0" when power supply from the battery 65 to the rotational angle detecting device 20 is stopped. Thus, the volatile memory 241 automatically returns the stored data to the initial value "0" when the power supply is stopped, whereby a process to rewrite the volatile memory 241 can be eliminated. Also, the power supply failure can be recognized without providing another memory device or a detecting logic.

In the present embodiment, the detection object is the motor 80 and the rotational information includes the rotational angle θm of the motor 80 and the rotation number N. The rotational angle calculator 23 continues at least calculating the rotation number N during the turn-off of the IG switch 60. Especially, the rotational angle detecting device 20 is applied to the electric power steering device 1 in the present embodiment. Thus, when the IG switch 60 is turned on, the steering angle θst can be calculated without relearning the neutral position of the steering wheel 91 using the rotational number N calculated during the turn-off of the IG switch 60.

The communication portion 25 is a serial interface, and thus the number of wirings can be reduced compared to a case where a parallel interface is used.

The communication portion 25 outputs the output information represented using multiple bits having a bit number twice or more times of a bit number of the power supply failure information. In the present embodiment, the power supply failure information is represented using one bit. Therefore, the communication portion 25 outputs the output information represented using two bits to the controller 50. Hence, even if an error occurs in a portion of the output information corresponding to one bit, the communication portion 25 can properly inform the controller 50 of the power supply failure using the other bit.

As described above, the rotational angle detecting device 20 is applied to the electric power steering device 1. The electric power steering device 1 includes the motor 80 that outputs an assistance torque to assist steering by a driver, and the ECU 10. The ECU 10 includes the rotational angle detecting device 20 and the controller 50 that controls the motor 80.

The controller 50 calculates the steering angle θst of the steering shaft 92 connected to the steering wheel 91, based on the rotational angle θm and the rotation number N.

The rotational detecting device 20 can continue calculating the rotational angle θm and the rotation number N by electric power supplied from the battery 65 even when the IG switch 60 is turned off. Thus, the controller 50 can calculate the steering angle θst, using the neutral position of the steering wheel 91 that is stored in the controller 50, based on the rotational angle θm, the rotation number N, and the gear ratio of the reduction gear 89, which connects the motor 80 to the steering shaft 92. Furthermore, the relearning of the neutral position of the steering wheel 91 can be eliminated when the IG switch 60 is turned on again.

The controller 50 can recognize whether the rotational angle θm and the rotation number N are calculated after the power supply failure occurs. Thus, the controller 50 can properly execute the fail-safe process. For example, if the rotational angle θm and the rotation number N are calculated after the power supply failure occurs, the controller 50 stops calculating the steering angle θst using the neutral position of the steering wheel 91, and relearns the neutral position of the steering wheel 91 as the fail-safe process.

Other Embodiments

Rotational Angle Calculator

In the above-described embodiment, the rotational angle calculator calculates the mechanical angle and the rotation number, as the rotational information. However, in place of the mechanical angle, an electrical angle (electrical radian) may be calculated as the rotational angle, and the rotation number can be calculated based on the electrical angle and the pole number. The rotational angle calculator may calculate the rotation number, and the controller may calculate the rotational angle. The rotational information may include any information that is associated with a rotation of the detection object.

In the above-described embodiment, when IG switch is turned off, the calculation of the rotational angle and the rotation number are maintained. In this connection, the steering angle would be able to be calculated using the neutral position of the steering wheel stored in the controller, if the rotation number during the turn-off of the IG switch and the rotational angle at the time of the turn-on of the IG switch (i.e., the motor position) are obtained. In view of this, when the IG switch is turned off, the calculation of the rotational angle may be stopped while continuing the calculation of the rotation number. With this, electric consumption at the rotational angle detecting device during the turn-off of the IG switch can be suppressed. In this case, the rotational number may be preferably calculated at least one time at the rotational angle less than 180°. For example, the rotational number may be calculated at each 90°. Thus, the rotational direction of the motor can be accurately determined, whereby the steering angle can be properly calculated.

In a case where the calculation of the rotational angle is stopped when the IG switch is turned off, a detecting portion to calculate the rotational angle and a detecting portion to calculate the rotation number may be provided as the sensor. In this case, when the IG switch is turned off, an operation of the detecting portion to calculate the rotation number may be stopped.

(Memory)

In the above-described embodiment, the volatile memory is used as the memory. However, a nonvolatile memory may be used as the memory.

In the above-described embodiment, the volatile memory returns the stored data to the initial value "0" when electric power is not supplied from the battery, and stores the normal value "1" when the communication portion receives the notifying signal. However, the bit information of "0" and "1" may be reversed. That is, when power supply from the battery is stopped, the volatile memory may store "1" as the initial value, whereas when the communication portion receives the notifying signal, the volatile memory may store "0" as the normal value. Likewise, the output information from the communication portion may have reversed bit information "0" and "1". That is, the output information of "0" may indicate that the power supply failure does not occur and the output information of "1" may indicate that the power supply failure occurs.

In the above-described embodiment, the power supply failure information stored in the volatile memory is represented using one bit. However, the power supply failure information may be represented using multiple bits. For example, when two bits are used, the initial value may be represented by "01" and the normal value may be represented by "10". In this case, the bit information of "00" or "11" may be used as abnormality information indicating, for example, a short circuit. Accordingly, the controller can be informed of abnormality related to power supply to the rotational angle detecting device. Furthermore, when the power supply failure information is represented using multiple bits greater than two bits, the controller can be more properly informed of the abnormality related to power supply to the rotational angle detecting device.

(Output Information)

In the above-described embodiment, the output information is output from the communication portion regardless of the turn-on/off of the IG switch. However, since operation of the controller is stopped when the IG switch is turned off, the communication portion may stop outputting the output information during the turn-off of the IG switch. For example, it may be determined whether the IG switch is turned on/off between Steps 104 and 105 in FIG. 3. The process may proceed to Step 105 when the IG switch is turned on, whereas the process may proceed to Step 106 when the IG switch is turned off. Similarly, it may be determined whether the IG switch is turned on/off between Steps 108 and 109. Then, the process may proceed to Step 109 when the IG switch is turned on, whereas the process may finish without executing Step 109 when the IG switch is turned off.

Further, the process at Steps 105 and 109 may be independently executed from the main process. For example, the process at Steps 105 and 109 may be executed when the rotational angle detecting device receives a request for the output information from the controller.

(Notifying Signal)

In the above-described embodiment, the controller outputs the notifying signal to the rotational angle detecting device after relearning the neutral position of the steering wheel. However, the controller may output the notifying signal at any timing after receiving the output information. For example, the controller may output the notifying signal after receiving the output information but before relearning the neutral position of the steering wheel. In this case, the controller can early recognize next occurrence of the power supply failure.

(Detection Object)

In the above-described embodiment, the detection object is the motor. However, the rotational angle detecting device may detect a rotation of a detection object other than the motor. The rotational angle detecting device may be applied to a device other than the electric power steering device.

In the above-described embodiment, the three-phase brushless motor is used as the motor. However, any kinds of motors, such as a brush motor, may be used as the motor.

What is claimed is:

1. A rotational angle detecting device that is directly supplied with electric power from a battery and outputs rotational information of a detection object to a controller, the controller being provided separately from the rotation angle detecting device and being connected to the battery through an ignition switch that switches power supply to the controller from the battery, the rotational angle detecting device comprising:
- a sensor that detects a detection value that is variable according to a rotation of the detection object;
- a calculator that calculates the rotational information based on the detection value detected by the sensor;
- a memory that stores power supply failure information indicating whether power supply failure occurs in which electric power is not supplied to the rotational angle detecting device from the battery; and
- a communication portion that outputs the rotational information and output information corresponding to the power supply failure information stored in the memory to the controller, the communication portion receiving a notifying signal from the controller that outputs the notifying signal after the controller receives the output information indicating that the power supply failure occurs, wherein
- the memory stores the power supply failure information indicating that the power supply failure occurs, during a period after the power supply failure occurs until the communication portion receives the notifying signal from the controller, and
- the controller is only powered from the battery through the ignition switch.

2. The rotational angle detecting device according to claim 1, wherein
the memory is a volatile memory that returns the power supply failure information to an initial value indicating that the power supply failure occurs, when the power supply failure occurs.

3. The rotational angle detecting device according to claim 1, wherein
the detection object is a motor,
the rotational information includes a rotational angle and a number of rotations of the motor, and
the calculator continues calculating at least the number of rotations while the ignition switch is turned off.

4. The rotational angle detecting device according to claim 3, wherein
the calculator calculates the number of rotations of the motor at least one time at the rotational angle of less than 180°.

5. The rotational angle detecting device according to claim 1, wherein
the power supply failure information is represented using multiple bits.

6. The rotational angle detecting device according to claim 1, wherein
the communication portion includes a serial interface.

7. The rotational angle detecting device according to claim 6, wherein
the communication portion outputs the output information represented using multiple bits having a bit number twice or more times of a bit number of the power supply failure information.

8. An electric power steering device comprising:
a motor that outputs an assistance torque to assist steering of a steering member by a driver;
the rotational angle detecting device according to claim 1, the detection object for the rotational angle detecting device being the motor; and
an electric control unit that includes the controller controlling the motor.

9. The electric power steering device according to claim 8, wherein
the controller calculates a rotational angle of a steering shaft connected to the steering member based on the rotational information.

10. The electric power steering device according to claim 9, wherein
the controller executes a fail-safe process when the controller receives the output information indicating that the power supply failure occurs.

11. The electric power steering device according to claim 10, wherein
the controller outputs the notifying signal upon executing the fail-safe process.

12. The electric power steering device according to claim 10, wherein
the controller learns and stores a neutral position of the steering member, and
the controller calculates the rotational angle of the steering shaft using the neutral position of the steering member and the rotational information when the ignition switch is turned on and the controller receives the output information indicating that the power supply failure does not occur.

13. The electric power steering device according to claim 12, wherein
the controller relearns the neutral position of the steering member as the fail-safe process to calculate the rotational angle of the steering shaft when the ignition switch is turned on and the controller receives the output information indicating that the power supply failure occurs.

14. The rotational angle detecting device of claim 1, wherein
the notifying signal received by the communication portion from the controller indicates that the controller has completed detecting a neutral position of the detection object.

15. A rotational angle detecting system, comprising:
a rotational angle detecting device that is directly supplied with electric power from a battery; and
a controller provided separately from the rotation angle detecting device and being connected to the battery through an ignition switch that switches power supply to the controller from the battery, wherein
the rotational angle detecting device includes
- a sensor that detects a detection value that is variable according to a rotation of a detection object;
- a calculator that calculates a rotational information of the detection object based on the detection value detected by the sensor;
- a memory that stores power supply failure information indicating an occurrence of a power supply failure in which electric power is not supplied to the rotational angle detecting device from the battery; and
- a communication portion that outputs the rotational information to the controller,
the memory is a volatile memory that, when the power supply failure occurs, sets the power supply failure information to an initial value indicating the occurrence of the power supply failure,
the rotational angle detecting device is programmed to:
- determine whether the power supply failure information stored in the memory indicates the occurrence of a power supply failure,
- after determining that the power supply failure information stored in the memory indicates the occurrence of a power supply failure, output the power supply failure information to the controller and receive a notifying signal from the controller, and after receiving the notifying signal from the controller, set the supply failure information to a normal value indicating no occurrence of the power supply failure, and the controller is programmed to:

receive the power supply failure information indicating the occurrence of a power supply failure from the rotational angle detecting device, after receiving the power supply failure information, detect a neutral position of the detection object, and after detecting the neutral position of the detecting object, output the notifying signal to the rotational angle detecting device.

16. A rotational angle detecting system, comprising:

a rotational angle detecting device that is directly supplied with electric power from a battery; and a controller provided separately from the rotation angle detecting device and being connected to the battery through an ignition switch that switches power supply to the controller from the battery, wherein the rotational angle detecting device includes a sensor that detects a detection value that is variable according to a rotation of a detection object;

a calculator that calculates a rotational information of the detection object based on the detection value detected by the sensor;

a memory that stores power supply failure information indicating an occurrence of a power supply failure in which electric power is not supplied to the rotational angle detecting device from the battery; and a communication portion that outputs the rotational information to the controller, the memory is a volatile memory that, when the power supply failure occurs, sets the power supply failure information to an initial value indicating the occurrence of the power supply failure, the rotational angle detecting device is programmed to:

upon the occurrence of a power supply failure, set the power supply failure information in the memory to the initial value indicating the occurrence of a power supply failure, after setting the power supply failure information in the memory indicating the occurrence of a power supply failure, output the power supply failure information to the controller and receive a notifying signal from the controller, and after receiving the notifying signal from the controller, set the supply failure information to a normal value indicating no occurrence of the power supply failure, and the controller is programmed to:

receive the power supply failure information indicating the occurrence of a power supply failure from the rotational angle detecting device, after receiving the power supply failure information, detect a neutral position of the detection object, and after detecting the neutral position of the detecting object, output the notifying signal to the rotational angle detecting device.

* * * * *